United States Patent
Da Silva et al.

(10) Patent No.: US 12,279,120 B2
(45) Date of Patent: Apr. 15, 2025

(54) HANDLING RADIO RESOURCE CONTROL REJECTIONS

(71) Applicant: Telefonaktiebolaget LM Ericsson (PUBL), Stockholm (SE)

(72) Inventors: Icaro L. J. Da Silva, Solna (SE); Magnus Stattin, Upplands Väsby (SE); Gunnar Mildh, Sollentuna (SE); Prajwol Kumar Nakarmi, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 815 days.

(21) Appl. No.: 17/423,789

(22) PCT Filed: Jan. 21, 2020

(86) PCT No.: PCT/IB2020/050441
§ 371 (c)(1),
(2) Date: Jul. 16, 2021

(87) PCT Pub. No.: WO2020/152580
PCT Pub. Date: Jul. 30, 2020

(65) Prior Publication Data
US 2022/0116784 A1   Apr. 14, 2022

Related U.S. Application Data

(60) Provisional application No. 62/794,910, filed on Jan. 21, 2019.

(51) Int. Cl.
*H04W 12/122* (2021.01)
*H04W 12/037* (2021.01)
(Continued)

(52) U.S. Cl.
CPC ....... *H04W 12/122* (2021.01); *H04W 12/037* (2021.01); *H04W 12/63* (2021.01); *H04W 76/18* (2018.02); *H04W 76/27* (2018.02)

(58) Field of Classification Search
CPC . H04W 12/122; H04W 12/037; H04W 12/63; H04W 76/18; H04W 76/27; H04W 48/00
See application file for complete search history.

(56) References Cited

U.S. PATENT DOCUMENTS

2008/0125043 A1* 5/2008 Karmanenko ...... H04W 12/106
455/41.2
2010/0035599 A1   2/2010 Chen
(Continued)

FOREIGN PATENT DOCUMENTS

| CN | 108566303 A | 9/2018 |
| DE | 1017214126 A1 | 2/2018 |
| DE | 102017214126 | 2/2018 |

OTHER PUBLICATIONS

Mavoungou et al., "Survey on Threats and Attacks on Mobile Networks", Aug. 2016, IEEE Access, vol. 4, pp. 4543-4572 (Year: 2016).*

(Continued)

*Primary Examiner* — Kenneth W Chang
(74) *Attorney, Agent, or Firm* — Baker Botts L.L.P.

(57) ABSTRACT

A method performed by a wireless device includes receiving a Radio Resources Control Reject (RRCReject) message and determining whether to act on the RRCReject message based on a configuration of the wireless device. The method may also include receiving a configuration message that includes the configuration from a network node.

25 Claims, 13 Drawing Sheets

(51) Int. Cl.
*H04W 12/63* (2021.01)
*H04W 76/18* (2018.01)
*H04W 76/27* (2018.01)

(56) References Cited

U.S. PATENT DOCUMENTS

| | | | | |
|---|---|---|---|---|
| 2010/0265847 | A1* | 10/2010 | Lee | H04L 5/001 |
| | | | | 370/254 |
| 2013/0288679 | A1* | 10/2013 | Yi | H04W 48/02 |
| | | | | 455/435.1 |
| 2014/0349694 | A1* | 11/2014 | Raghothaman | H04W 40/22 |
| | | | | 455/509 |
| 2016/0029426 | A1* | 1/2016 | Bangolae | H04W 72/04 |
| | | | | 370/329 |
| 2016/0234877 | A1* | 8/2016 | Bangolae | H04W 76/27 |
| 2017/0311290 | A1* | 10/2017 | Adjakple | H04W 76/18 |
| 2018/0220341 | A1* | 8/2018 | Dai | H04W 76/28 |
| 2018/0295125 | A1* | 10/2018 | Lee | H04W 76/27 |
| 2018/0359643 | A1* | 12/2018 | Park | H04W 12/126 |

OTHER PUBLICATIONS

Communication Pursuant to Article 94(3) EPC issued for Application No. 20 703 087.5-1218—Jan. 4, 2024.

Office Action issued for Chinese Patent Application Serial No. 202080010159.5—Nov. 30, 2023.

Search Report issued for Chinese Application Serial No. 2020800101595—Nov. 28, 2023.

3GPP TSG-RAN WG2 Meeting #101bis; Sanya, China; Source: ZTE Corporation, Sanechips; Title: Security of Reject message (R2-1804460)—Apr. 16-20, 2018.

3GPP TSG-RAN WG2 101-bis; Sanya, China; Source: Huawei, HiSilicon; Title: Discussion on DoS attacks for rejection procedure (R2-1805316, Revision of R2-1803266)—Apr. 16-20, 2018.

3GPP TSG-RAN WG2 Meeting #102; Busan, Kora; Source: CATT; Title: UE actions upon receiving RRCReject (R2-1806717)—May 21-25, 2018.

3GPP TSG-RAN WG2 Meeting #103bis; Chengdu, China; Source: Apple; Title: UE operation upon RRC reject reception (R2-1815010)—Oct. 8-12, 2018.

3GPP TSG-RAN WG2 Meeting #103bis; Chengdu, China; Change Request; Title: UE operation on RRC Rejection Reception; Source to WG: Apple; Source to TSG: R2 (R2-1815011)—Oct. 8-12, 2018.

PCT International Search Report issued for International application No. PCT/IB2020/050441—Mar. 13, 2020.

PCT Written Opinion of the International Searching Authority issued for International application No. PCT/IB2020/050441—Mar. 13, 2020.

* cited by examiner

HANDLING RADIO RESOURCE CONTROL REJECTIONS

PRIORITY

This nonprovisional application is a U.S. National Stage Filing under 35 U.S.C. § 371 of International Patent Application Serial No. PCT/IB2020/050441 filed Jan. 21, 2020 and entitled "Handling Radio Resource Control Rejections" which claims priority to U.S. Provisional Patent Application No. 62/794,910 filed Jan. 21, 2019 both of which are hereby incorporated by reference in their entirety.

BACKGROUND

The 3GPP NR/NG-RAN architecture is described in, for example, TS 38.300 v. 15.3.0, Subclause 4.1, as follows:
An NG-RAN node is either:
  a gNB, providing NR user plane and control plane protocol terminations towards the UE; or
  an ng-eNB, providing E-UTRA user plane and control plane protocol terminations towards the UE.
The gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface (see 3GPP TS 23.501 [3]).
NOTE: The architecture and the F1 interface for a functional split are defined in 3GPP TS 38.401 [4].
FIG. 1 illustrates the NG-RAN architecture.

Access Stratum (AS) is the functional groupings consisting of the parts in the infrastructure and in the user equipment (UE) and the protocols between these parts being specific to the access technique (i.e. the way the specific physical media between the User Equipment and the Infrastructure is used to carry information). The access stratum provides services related to the transmission of data over the radio interface and the management of the radio interface to the other parts of the system.

The protocol in the AS used for managing the radio interface between UE and NG-RAN is the Radio Resource Control (RRC) protocol (terminated in gNB on the network side). The RRC protocol in NR/NG-RAN performs the functions listed in subclause 7 of TS 38.300. 3GPP TS 38.331 and 3GPP TS 36.331 define RRC protocol for NR and E-UTRA, respectively.

Non-Access Stratum (NAS) is the functional groupings consisting of the parts in the infrastructure and in the user equipment (UE) and the protocols between these parts being not specific to the access technique. As related to protocols, the Non-Access Stratum is a set of protocols in the 5G System (5GS). The NAS is used to convey non-radio signalling between the User Equipment (UE) and the Access and Mobility Management Function (AMF) for an NR/NG-RAN access.

The NAS control protocol (terminated in AMF on the network side) performs the functions listed in 3GPP TS 23.501, for instance: authentication, mobility management, security control, etc.

The RRC protocol disclosed in TS 38.331 v 15.4.0, Subclause 4.2.2 defines Signalling Radio Bearers (SRBs) as follows:

"Signalling Radio Bearers" (SRBs) are defined as Radio Bearers (RBs) that are used only for the transmission of RRC and NAS messages. More specifically, the following SRBs are defined:
  SRB0 is for RRC messages using the CCCH logical channel;
  SRB1 is for RRC messages (which may include a piggybacked NAS message) as well as for NAS messages prior to the establishment of SRB2, all using DCCH logical channel;
  SRB2 is for NAS messages, all using DCCH logical channel SRB2 has a lower-priority than SRB1 and may be configured by the network after security activation;
  SRB3 is for specific RRC messages when UE is in EN-DC, all using DCCH logical channel
In downlink piggybacking of NAS messages is used only for bearer establishment/modification/release. In uplink piggybacking of NAS message is used only for transferring the initial NAS message during connection setup and connection resume.
NOTE 1: The NAS messages transferred via SRB2 are also contained in RRC messages, which however do not include any RRC protocol control information.
Once security is activated, all RRC messages on SRB1, SRB2 and SRB3, including those containing NAS messages, are integrity protected and ciphered by PDCP. NAS independently applies integrity protection and ciphering to the NAS messages.
Note: FFS which SRBs are used for NE-DC, NR-NR DC.

With regard to the RRC Reject procedure in NR, the network may reject an incoming UE that attempts to resume or setup an RRC connection in a given target cell. That is typically used by networks as one of the existing load protection mechanisms (in addition to, e.g., unified access control in NR) when the network is overloaded and wants to reject UEs for some time. FIG. 2 illustrates a network reject of an RRC connection establishment. FIG. 3 illustrates a network reject of an RRC connection resume.

Upon the reception of an RRCReject message, the UE starts a wait timer (the value of which is provided in the RRCReject message). If the attempt was requested by upper layers, upper layers are also informed that barring is applicable. Upon the expiry of the wait timer, barring is alleviated and, the UE may try to access the cell again (in case there is no other barring condition implied by access control). The procedure is described as follows in the RRC specifications:
  5.3.15 RRC connection reject
  5.3.15.1 Initiation
  The UE initiates the procedure upon the reception of RRCReject when the UE tries to establish or resume an RRC connection.
  5.3.15.2 Reception of the RRCReject by the UE
  The UE shall:
    1>stop timer T300, if running;
    1>stop timer T319, if running;
    1>stop timer T302, if running;
    1>reset MAC and release the default MAC Cell Group configuration;
    1>if waitTime is configured in the RRCReject:
      2>start timer T302, with the timer value set to the waitTime;
    1>if RRCReject is received in response to a request from upper layers:
      2>inform the upper layer that access barring is applicable for all access categories except categories '0' and '2';

1>if RRCReject is received in response to an RRC-SetupRequest:
  2>inform upper layers about the failure to setup the RRC connection, upon which the procedure ends;
1>else if RRCReject is received in response to an RRCResumeRequest or an RRCResumeRequest 1:
  2>if resume is triggered by upper layers:
    3>inform upper layers about the failure to resume the RRC connection;
    Note: FFS In which cases upper layers are informed that a resume failure occurred upon the reception of RRC Reject.
  2>if resume is triggered due to an RNA update:
    3>set the variable pendingRnaUpdate to true;
  2>discard the current $K_{gNB}$ key, the $K_{RRcenc}$ key, the $K_{RRCint}$ key, the $K_{UPint}$ key and the $K_{UPenc}$ key derived in accordance with 5.3.13.3;
  2>suspend SRB1, upon which the procedure ends;
The RRC_INACTIVE UE shall continue to monitor paging while the timer T302 is running
The message is described as follows in RRC specifications as follows:
RRCReject
  The RRCReject message is used to reject an RRC connection establishment or an RRC connection resumption.
Signalling radio bearer: SRB0
RLC-SAP: TM
Logical channel: CCCH
Direction: Network to UE
RRCReject message

---

-- ASN1START
-- TAG-RRCREJECT-START
RRCReject ::=                    SEQUENCE {
    criticalExtensions           CHOICE {
        rrcReject                RRCReject-IEs,
        criticalExtensionsFuture    SEQUENCE { }
    }
}
RRCReject-IEs ::=                SEQUENCE {
    waitTime                     RejectWaitTime
OPTIONAL, --Need N
    lateNonCriticalExtension        OCTET STRING
OPTIONAL,
    nonCriticalExtension         SEQUENCE{ }
OPTIONAL
}
-- TAG-RRCREJECT-STOP
-- ASN1STOP

---

| RRCReject-IEs field descriptions |
| --- |
| waitTime |
| Wait time value in seconds. The field is always included in case of resume or initial setup. |

As can be seen, the RRCReject message is transmitted on SRB0 and, as such, is not integrity protected and not encrypted. The background for that solution in 3GPP was that RRC Reject is to be used during overload and, the target node should not bother fetching the context and starting security, in order to protect and/or encrypt the RRCReject message.

It may be noted that the Reject procedure shares some similarities in NR and LTE, but this disclosure describes only the procedure used in NR.

There currently exist certain challenges. For example, with the existing approach where RRCReject is sent on SRB0 and is unprotected and unciphered, a false base station may be used. This generally refers to a device that pretends to be a genuine base station, and which could be used by attackers to perform some wrongdoing like unauthorized surveillance, communication sabotage, and/or unsolicited advertising. Other names for a false base station include IMSI catcher, stingray, rogue base station, and cell site simulator.

More specifically, with the current mechanism, the RRCReject is not security protected and therefore can be misused by false base stations. A false base station could send a self-constructed or previously-captured RRCReject message to a UE, thereby taking the UE out of communication. As the message is not protected, the UE has no means to distinguish whether that message was sent by a real base station or by a fake base station. In other words, a fake base station may broadcast a cell with some system information and, any incoming UE from an RRC_IDLE, RRC_INACTIVE or even in RRC_CONNECTED state going via reestablishment could try to resume/Setup the connection there and be rejected, in some sort of Denial of Service attack.

The issue may be mitigated thanks to the existence of the waitTime timer, described above. The waitTime (with maximum value of 16 seconds) is included by design in the RRCReject message which gives an opportunity to UEs to try again, if needed, and avoid lock-outs. The assumption is that a real network would set a timer value that protects itself while it is still overloaded. So, an attacker can only send the UE out of communication for 16 seconds at once.

However, with the existing mechanism, the attacker can send another RRCReject message and keep doing that subsequently. This will keep the UE out of communication for as long as the attacker keeps sending RRCReject messages. Another technique to address the above problem is the use of a network policy, which indicates to the UE whether or not to accept certain RRC message before security activation. For example, in case of 4G/LTE, Clause 9.9.3.52 in TS 24.301 and Clause 5.3.8.3 in TS 36.331 explain the use of such network policy. In this technique, the UE is given the network policy in run-time by the protocol called the non-access stratum (NAS) protocol. The UE uses the given policy and would ignore an RRC message if received before security activation if the policy says so.

The above technique works in some cases but is too restrictive and therefore could be impractical since the network policy applies for the whole network. A network typically has many gNBs, and each one may have different versions and capabilities. So, with a single network policy, it is not possible to allow individual gNBs to have different policies.

It is extremely challenging to come up with a secure way to handle RRCReject messages and at the same time be flexible and practical.

SUMMARY

Certain aspects of the present disclosure and their embodiments may provide solutions to these or other challenges. According to certain embodiments, methods and systems are disclosed for identifying and preventing attacks of a false base station during a Reject procedure.

According to certain embodiments, a method performed by a wireless device includes receiving a Radio Resources Control Reject (RRCReject) message and determining whether to act on the RRCReject message based on a configuration of the wireless device.

According to certain embodiments, a wireless device includes processing circuitry configured to receive a RRCReject message and determine whether to act on the RRCReject message based on a configuration of the wireless device.

According to certain embodiments, a method performed by a network node includes sending a configuration to a wireless device for determining by the wireless device whether to act on a Radio Resource Control Reject, RRCReject, message.

According to certain embodiments, a network node includes processing circuitry configured to send a configuration to a wireless device for determining whether to act on a Radio Resource Control Reject, RRCReject, message.

Certain embodiments may provide one or more of the following technical advantages. For example, certain embodiments may enable a UE to identify an attack of a fake base station during a reject procedure. Counter-actions can be taken either by the UE or by the network, which makes the attack less attractive or, if it happens anyway, avoids the UE to get stuck under the coverage of a fake base station, being possibly out of service meanwhile.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
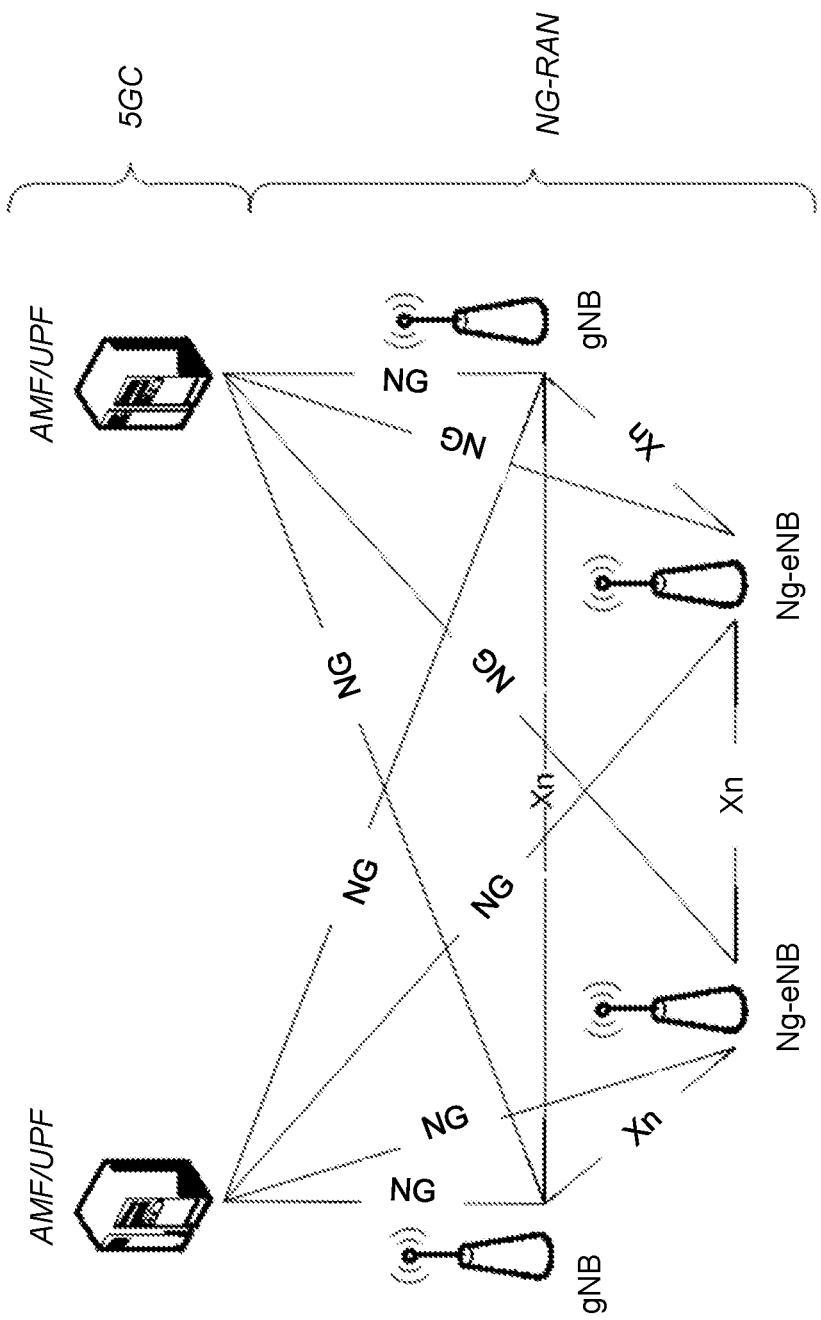
FIG. 1 illustrates the NG-RAN architecture.
Figure 2:
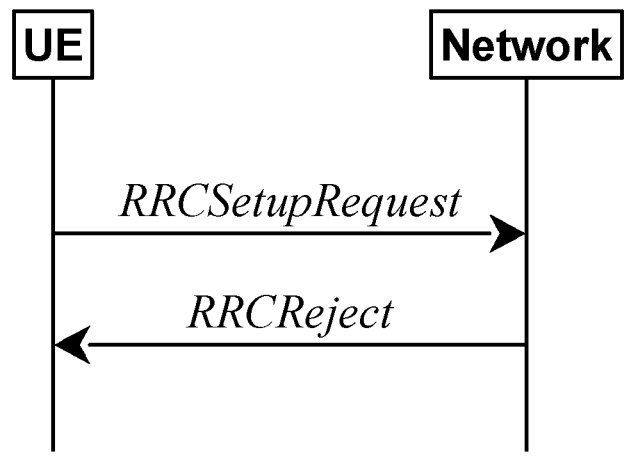
FIG. 2 illustrates a network reject of an RRC connection establishment.
Figure 3:
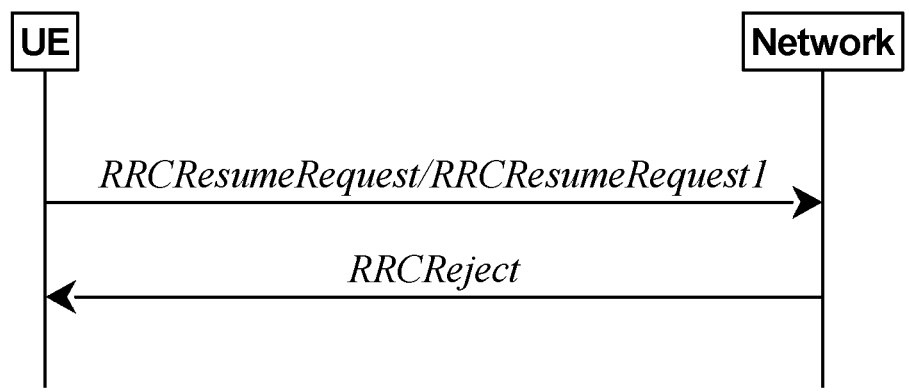
FIG. 3 illustrates a network reject of an RRC connection resume.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Though this disclosure uses the 5G terminologies, e.g., gNB and NR RRC message or field names, it should be appreciated that the techniques disclosed herein apply to both NR and E-UTRA, eNB, ng-eNB, and gNB.

Disclosed herein are solutions proposing several new mechanisms to handle the problems discussed above. For example, according to certain embodiments, a method at a wireless device is disclosed to identify and prevent attacks of a false base station during a Reject procedure. Also disclosed is a wireless device comprising appropriate hardware (e.g., processing circuitry) configured to perform said method. According to additional embodiments, a method at a base station is disclosed to take actions to prevent attacks of a false base station during a Reject procedure. Also disclosed is a base station/gNB comprising appropriate hardware (e.g., processing circuitry) configured to perform said method. These and other embodiments, which address one or more of the issues disclosed herein, will be described in more detail below.

According to certain embodiments, authenticated RRCReject messages may be used. For example, in a particular embodiment, the RRCReject message may contain a signature so that the UE can verify if the signature belongs to the genuine network. If the signature verification fails, the UE may know that either the RRCReject message was not sent by the genuine network or some attacker has tampered with the content of it.

According to particular embodiments, the signature calculation and verification could use asymmetric cryptography or public-key cryptography. In this kind of cryptography, there are two security keys. One is called the public key which is known to many and can be distributed. Another is called the private key which is known only to the owner and is not distributed. One of the applications of the asymmetric cryptography is calculation and verification of signatures (also called digital signatures). A sender would calculate a signature using its private key. The receiver would verify the signature using the sender's public key. The beauty of this cryptography is that many receivers could have the public key of the sender.

According to certain embodiments, each gNB may have their own private keys. And the UE would have the public keys of the gNBs (pre-provisioned or provisioned in run-time). The gNB would calculate a signature of the RRCReject message and the UE would verify the signature. According to certain embodiments, it could also be that there is a single private key for the whole network and all gNBs have copies of the private key. According to certain embodiments, it could also be that there is a single private key for the whole network and all gNBs use some central network function to obtain the signature of the RRCReject message that is to be sent to the UE.

Regardless of what kind of setup is used, the calculation and verification of the signature may contain following one of more of the following inputs in particular embodiments:
The content of the RRC message
The type of RRC message (e.g. associated to the procedure being rejected, which could be RRC Setup, RRC Resume, RRC Reestablishment, etc.)
Full timestamp
Partial timestamp (for example, using only the "hours" will allow clocks at UE and gNB to drift in the range of hour)
Radio resource properties (for example, cell radio network temporary identifier (C-RNTI), frame number, cell identifier, gNB identifier, UE identifier)
Geographic information (for example, latitude, longitude, altitude)
Run-time values (for example, one-time number (nonce) chosen by the UE and/or gNB)

The signature may also have replay protection such that the UE may be able to detect if it is receiving the same messages more than once. Further, the signature may have wormhole protection such that the UE may be able to detect if it is receiving a message that it was not supposed to receive (e.g., in a different location than expected).

The usage of these public key mechanisms during RRC reject may be something configurable by the network when the UE has security activated. Hence, the UE may know that a RRCReject message shall only be accepted when that has been configured. Otherwise, the RRCReject message shall be ignored and the UE shall perform cell selection to another cell possibly in another frequency and/or RAT.

According to certain embodiments, dedicated RRCReject messages may be used. For example, according to certain embodiments, the RRCReject message may be used only in SRB1. In certain kind of deployments, for example, it may be that the network may send RRCReject messages in SRB1 such as, for example, when the network supports and uses RRC_INACTIVE, or the network may run an access stratum security mode command procedure before rejecting the UE. A non-public network defined in 3GPP TR 23.734 is an example of such deployments. For example, a non-public network may be one included in a factory.

Such networks may indicate to the UE to not entertain any RRCReject message in SRB0, and instead entertain RRCReject messages only in SRB1. The network could send such indication in any security protected RRC/NAS message to the UE. The network could also pre-provision such indication to the UE (e.g., in universal subscriber identity module (USIM) or universal integrated circuit card (UICC)). In a variant of that, RRCRelease with waitTimer sent on SRB1 could be used instead of RRCReject, in response to an RRCReestablishment, RRCSetup, RRCResume, etc. Generally, the RRC stack and the handling of RRC messages is static in the UE side. For example, there are software/hardware instructions or logics on how to parse and treat RRC messages.

It is herein proposed, however, that the RRC stack (in general) and the handling of RRC messages (in general) are dynamically configurable on gNB and/or UE side. Without the loss of generality, this disclosure focuses on the UE side and the RRCReject message; however, it is generally recognized that the techniques and methods disclosed herein are applicable to the network side as well.

According to certain embodiments, the UE may not treat RRCReject message at all. In this way, the UE may directly ignore RRCReject message as soon as it determines the message type. Or the UE may directly ignore RRCReject message as it would have ignored any unknown message type.

An advantage of this mechanism (as compared to using network policy) is that the UE may not need to do full parsing of the RRCReject message before ignoring it. The UE also may not need to do any other further processing like determining if security in general has been activated or not. The UE also may not need to check if the RRCReject message in particular has any security protection or not.

There could be certain deployments where the network may not use RRCReject at all. It is only likely that the network deployments like non-public network (e.g., in a factory) may not have a need to use RRCReject. Those networks which do not use RRCReject may indicate to the UE to not entertain any RRCReject message, e.g., "No RRCReject in this network" flag in the access stratum security mode command message or some other security protected RRC/NAS message. The network could also pre-provision such indication to the UE (e.g., in universal subscriber identity module (USIM) or universal integrated circuit card (UICC)). It could also be standardized that all non-public network or certain non-public network or network with certain identifier do use RRCReject message.

According to certain embodiments, the UE may identify a fake base station and reporting to the real network. In a particular embodiment, the UE may log the reception of at least one RRCReject message on SRB0 and information associated and inform the network. For example, in a particular embodiment, if after the wait timer expires the UE successfully accesses the same cell that is a sign that the cell was NOT from a fake base station, the UE may delete the logged information. However, if the UE is subsequently rejected multiple times or a threshold number of X times the UE may log various pieces of information, including, for example, how many times that the UE detected the false base station, the wait time values provided, and/or information broadcasted by the cell where it has occurred (e.g. system information, cell identifiers, other network identifiers, tracking area codes, etc.). Then, once the UE manages to re-connected/resume to the network, the UE may notify the network of the existence of the logs for a potential fake base station. The network may request these logs to the UE, in a particular embodiment. Upon receiving that request, the UE may report the logs, which may enable the network to identify whether that was really a fake base station or whether that was a network node suffering for overload for a longer timer.

In a particular embodiment, a threshold for the number of rejects until the UE starts these logs may be set by the network or fixed in the specifications.

According to certain embodiments, the UE may avoid getting locked in a cell from fake base station. For example, in a particular embodiment, the UE may consider the cell barred if it suspects that this comes from a fake base station. Upon that, the UE may select another cell, possibly in another frequency or RAT. The suspicion can be modelled as a rule, where this is only triggered after X attempts being rejected in the same cell and/or the same frequency and/or the same RAT. In a particular embodiment, the barring event of the target cell after X attempts may also logged by the network. This feature may also be something configurable by the network as enabled/disabled. In a particular embodiment, the UE may be configured via SRB1 (i.e. while it has security activated) to accept or not an RRCReject message. If the UE receives a RRCReject message when it is configured not to accept such a message, the UE may perform cell selection and ignore the received RRCReject message.

In a particular embodiment, the activation/deactivation of the rule for the RRCReject message can be set with a validity area configured by the network, which may be a cell, a set of cells, a tracking area, a list of tracking area identifiers, etc. Within that area the activation or deactivation may be valid. For example, assume that the UE is configured by the network with secure signalling such as, for example, by reconfiguration over SRB1, not to accept RRCReject messages in an area and, the UE moves outside that area. Then, if upon the move, the UE tries to resume and is rejected, that can be accepted.

In a particular embodiment, upon cell selection after suspecting of being rejected by a fake base station, the UE may perform a tracking area update so that it tries to immediately connect to the real network. That can be modelled by an AS/NAS interaction where the AS informs the NAS of a failure and NAS triggers a NAS recovery via tracking area update. If the UE was rejected in inactive state, the UE may transition to idle. The various embodiments have been described in terms of UEs and base stations operating in wireless networks. These apparatuses and networks will now be described in more detail.

Figure 4:
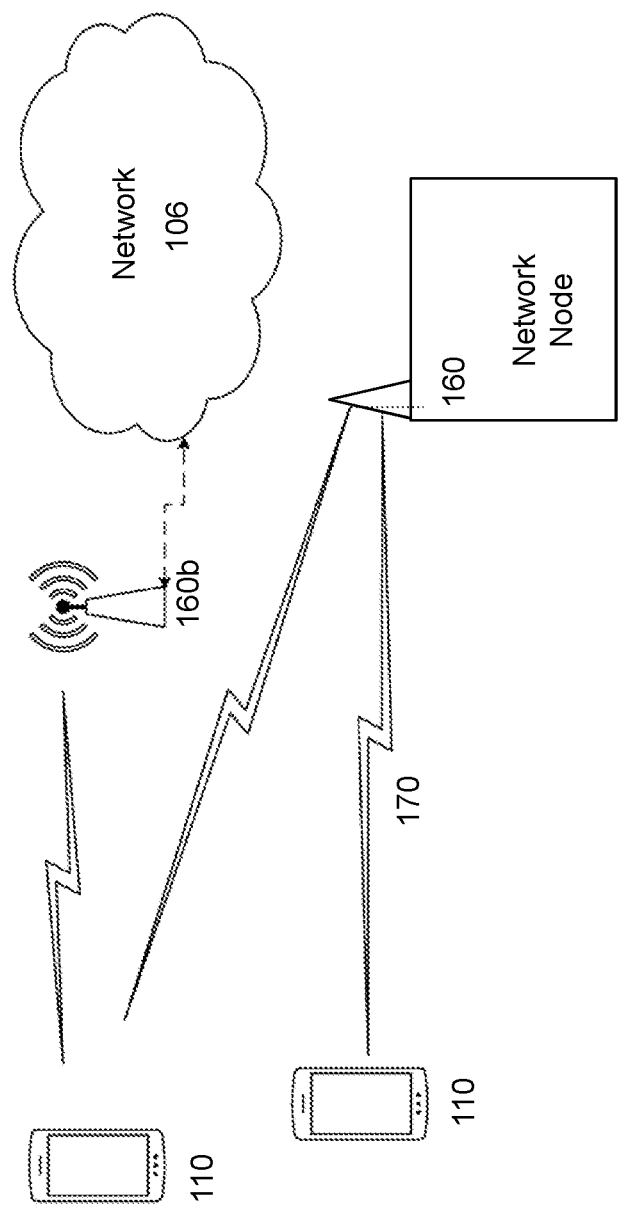
FIG. 4 illustrates an example wireless network, according to certain embodiments.

FIG. 4 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 106, network nodes 160 and 160b, and wireless devices 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 5:
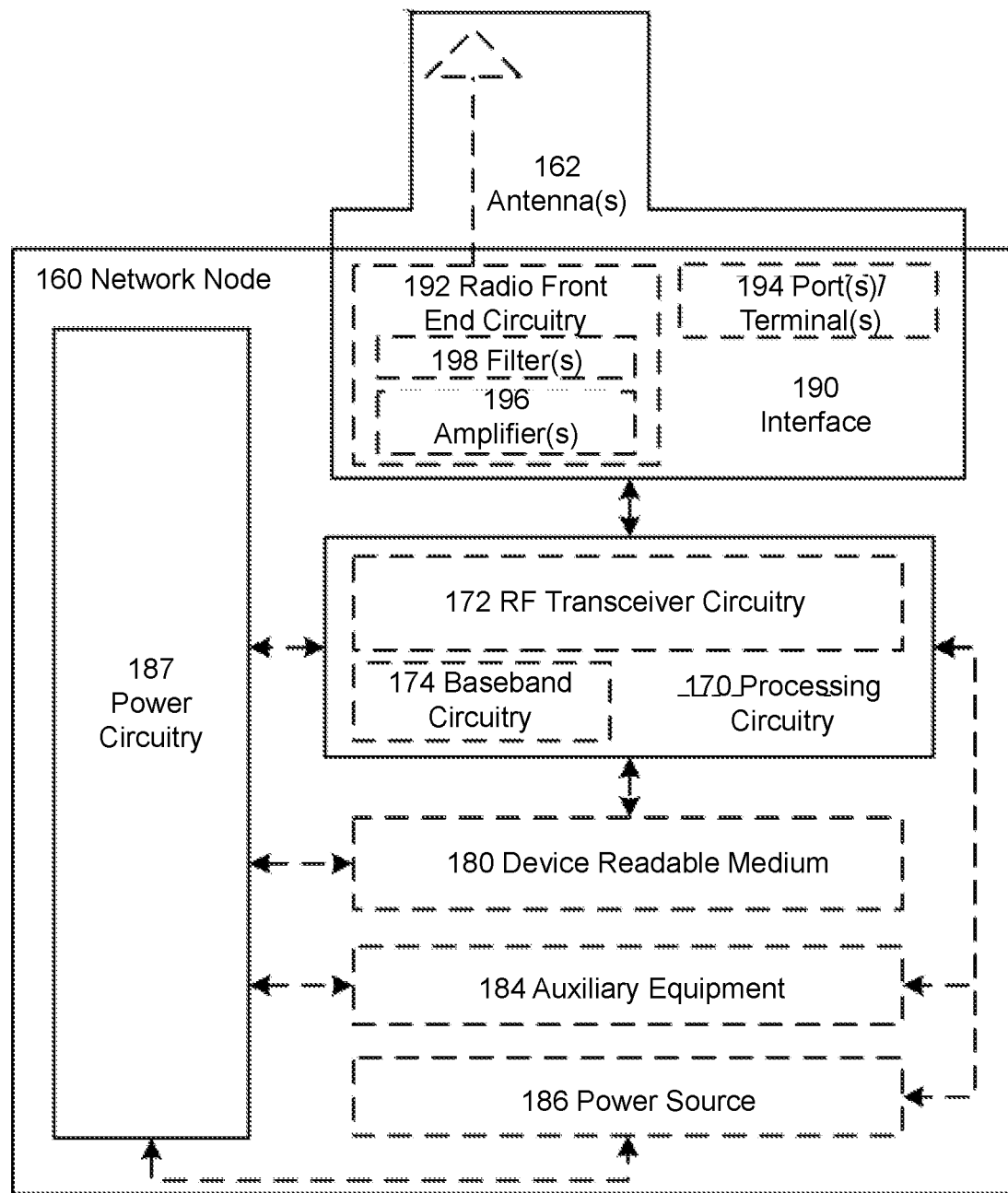
FIG. 5 illustrates an example network node, according to certain embodiments.

FIG. 5 illustrates an example network node, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 160 includes processing circuitry 170, device readable medium 180, interface 190, auxiliary equipment 184, power source 186, power circuitry 187, and antenna 162. Although network node 160 illustrated in the example wireless network of FIG. 4 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 5 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 6:
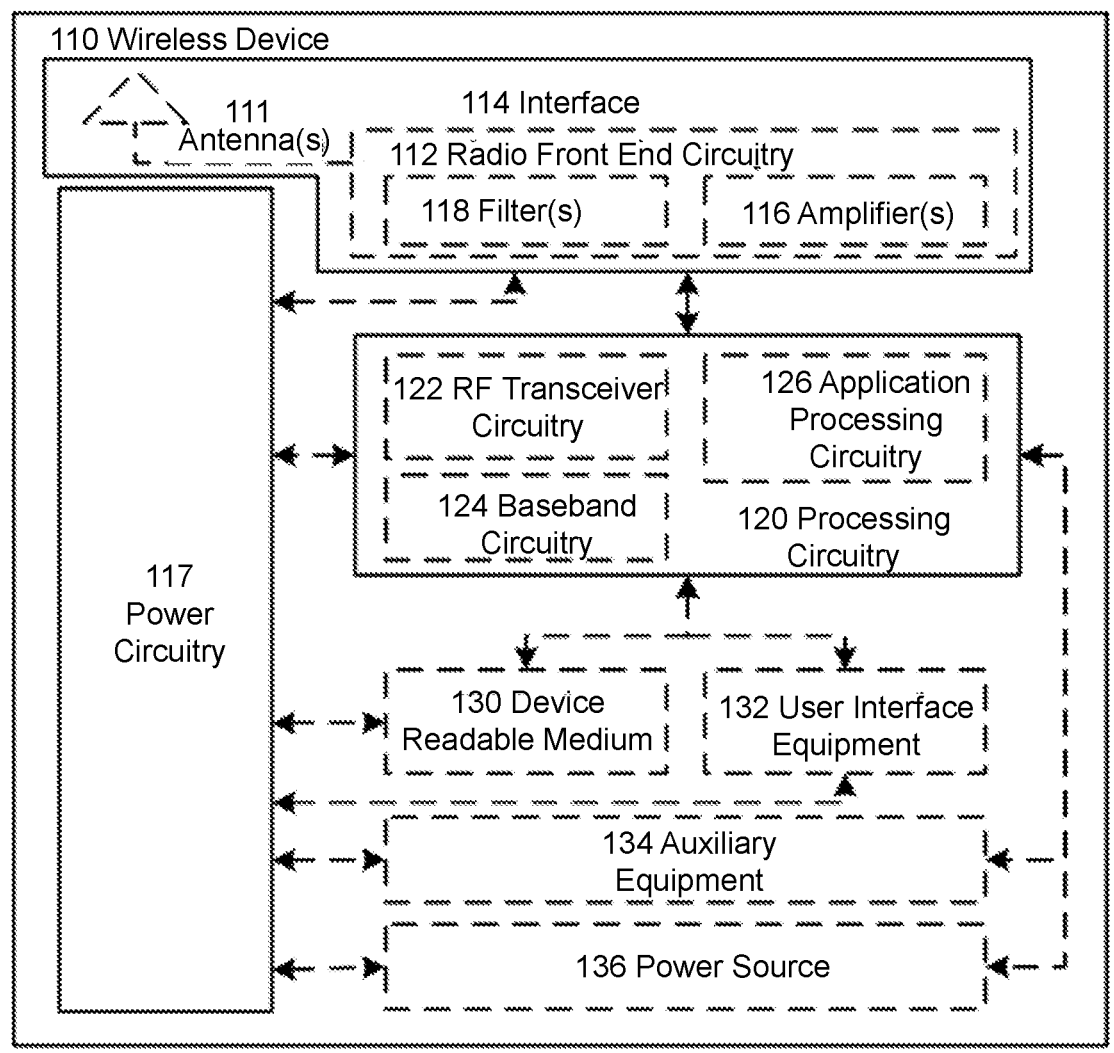
FIG. 6 illustrates an example wireless device, according to certain embodiments.

FIG. 6 illustrates an example wireless device, according to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network, and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. Wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 7:
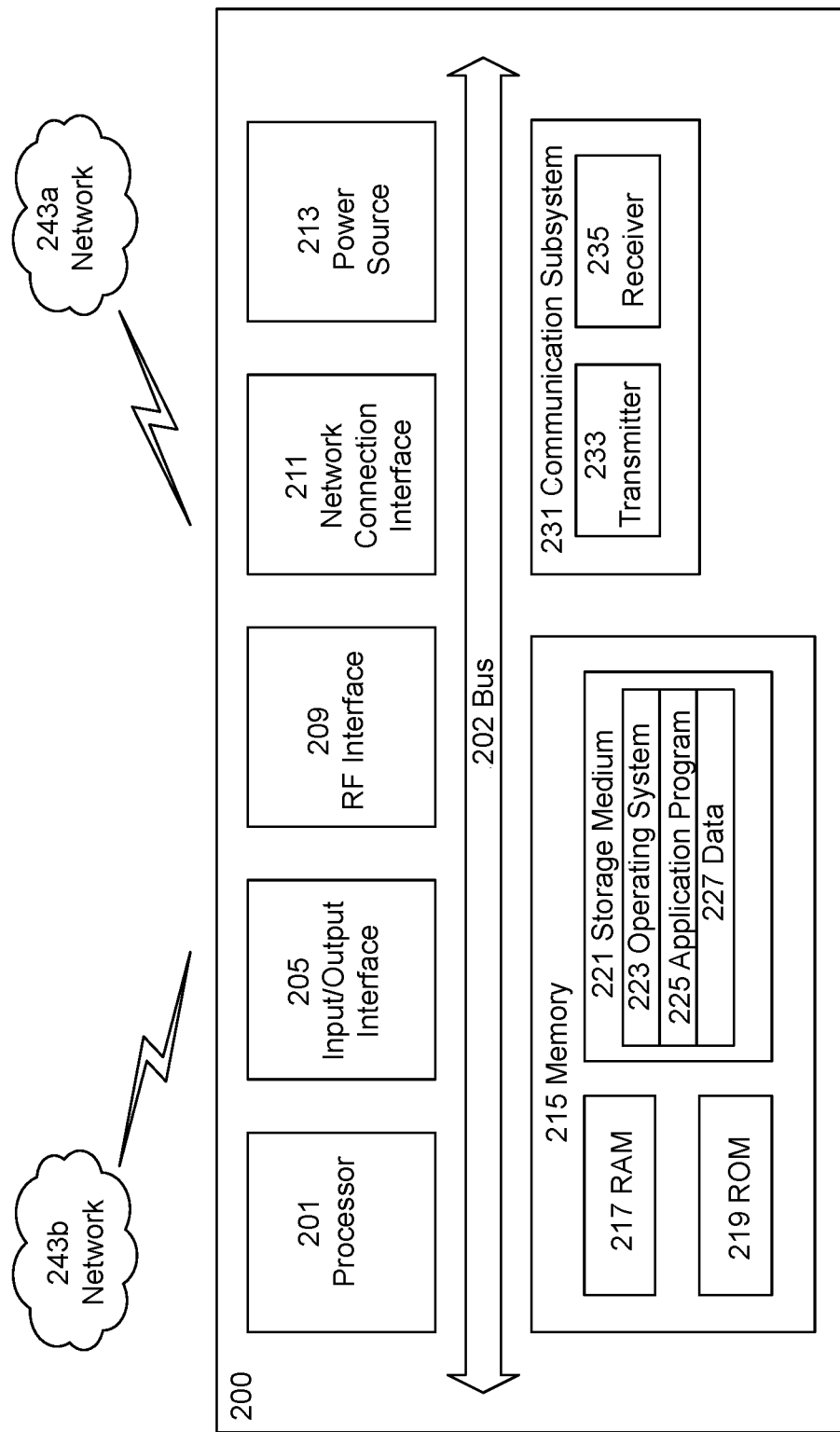
FIG. 7 illustrate an example user equipment, according to certain embodiments.

FIG. 7 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 7, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 7 is a UE, the components discussed herein are equally applicable to a wireless device, and vice-versa.

In FIG. 7, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 7, or only a subset of the components. The level of integration between the components may vary from one UE to another UE. Further, certain UEs may contain multiple instances of a component, such as multiple processors, memories, transceivers, transmitters, receivers, etc.

In FIG. 7, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 7, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 7, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.11, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 8:
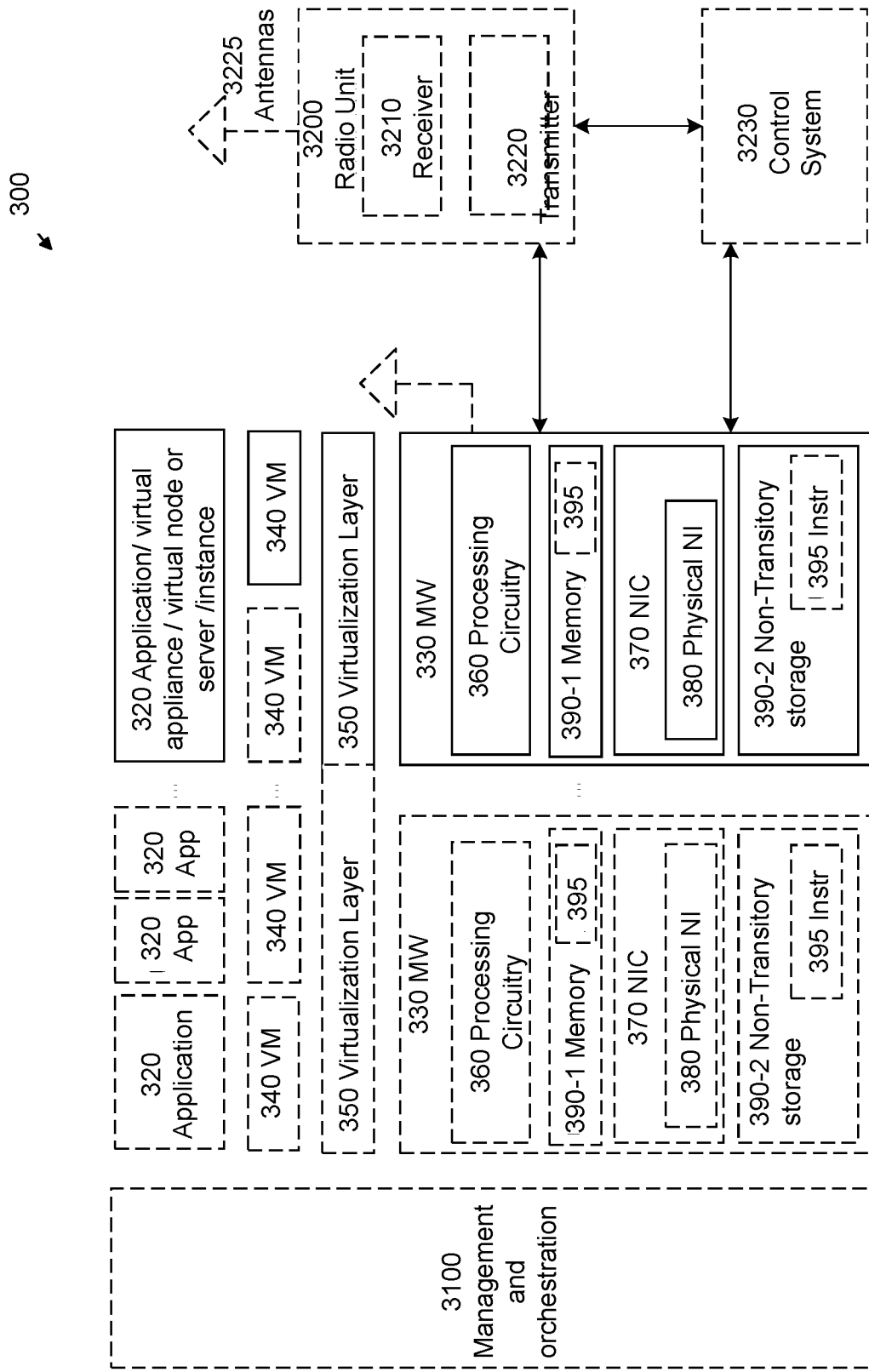
FIG. 8 illustrates a virtualization environment in which functions implemented by some embodiments may be virtualized, according to certain embodiments.

FIG. 8 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 8, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 8.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 9:
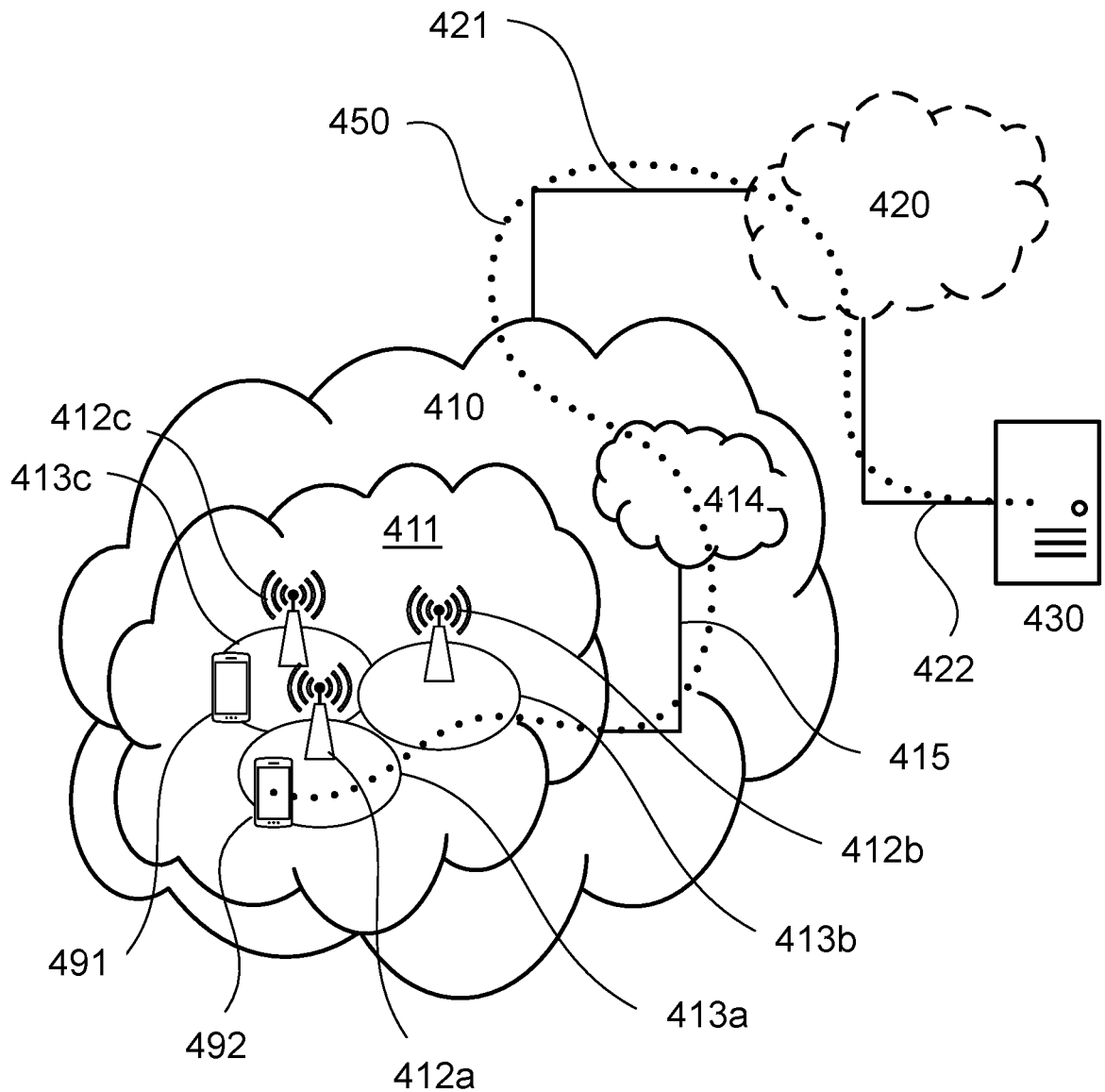
FIG. 9 illustrates a telecommunication network connected via an intermediate network to a host computer, according to certain embodiments.

FIG. 9 illustrates an example telecommunication network connected via an intermediate network to a host computer, in accordance with some embodiments.

With reference to FIG. 9, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412*a*. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 9 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 10:
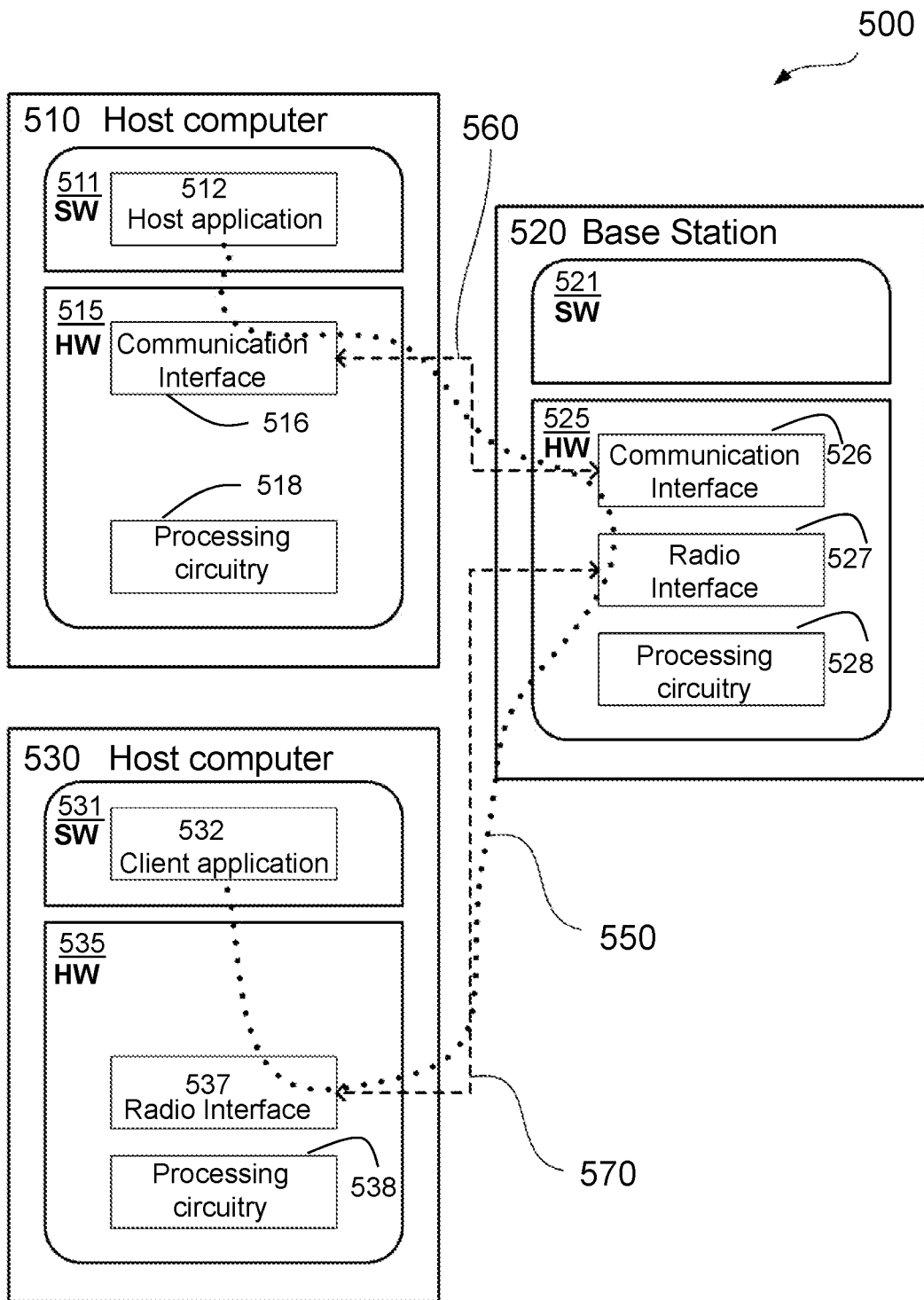
FIG. 10 illustrates a generalized block diagram of a host computer communicating via a base station with a user equipment over a partially wireless connection, according to certain embodiments.

FIG. 10 illustrates an example host computer communicating via a base station with a user equipment over a partially wireless connection, in accordance with some embodiments.

Example implementations, in accordance with an embodiment, of the UE, base station and host computer discussed in the preceding paragraphs will now be described with reference to FIG. 10. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 10) served by base station 520. Communication interface 526 may be configured to facilitate connection 560 to host computer 510. Connection 560 may be direct or it may pass through a core network (not shown in FIG. 10) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 10 may be similar or identical to host computer 430, one of base stations 412*a*, 412*b*, 412*c* and one of UEs 491, 492 of FIG. 9, respectively. This is to say, the inner workings of these entities may be as shown in FIG. 10 and independently, the surrounding network topology may be that of FIG. 9.

In FIG. 10, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may avoid or mitigate fake base station attacks, improving the data rate, latency, and power consumption, and thereby provide benefits such as reduced user waiting time, better responsiveness, and extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figures 11, 12:
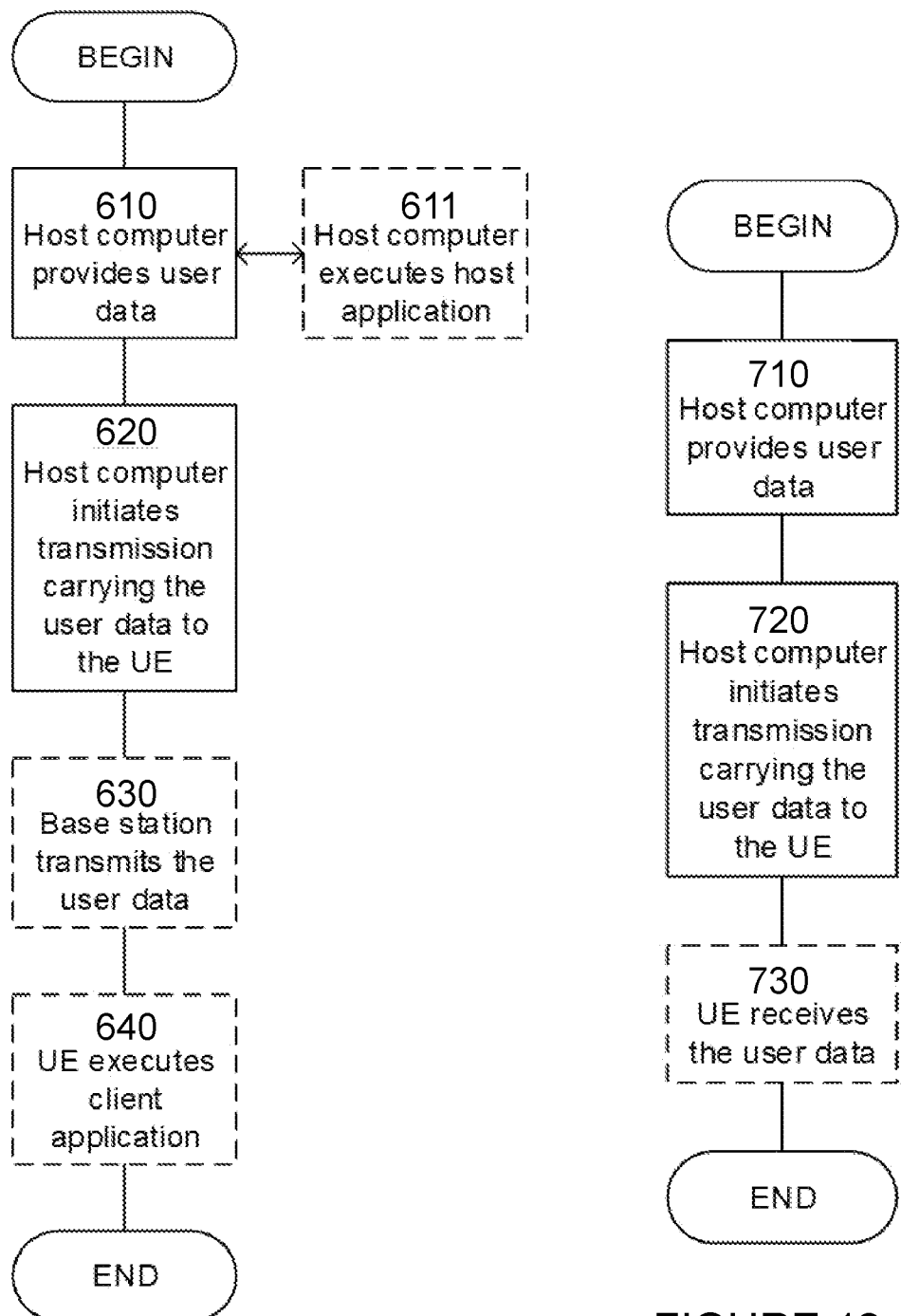
FIG. 11 illustrates a method implemented in a communication system, according to one embodiment.
FIG. 12 illustrates another method implemented in a communication system, according to one embodiment.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figures 13, 14:
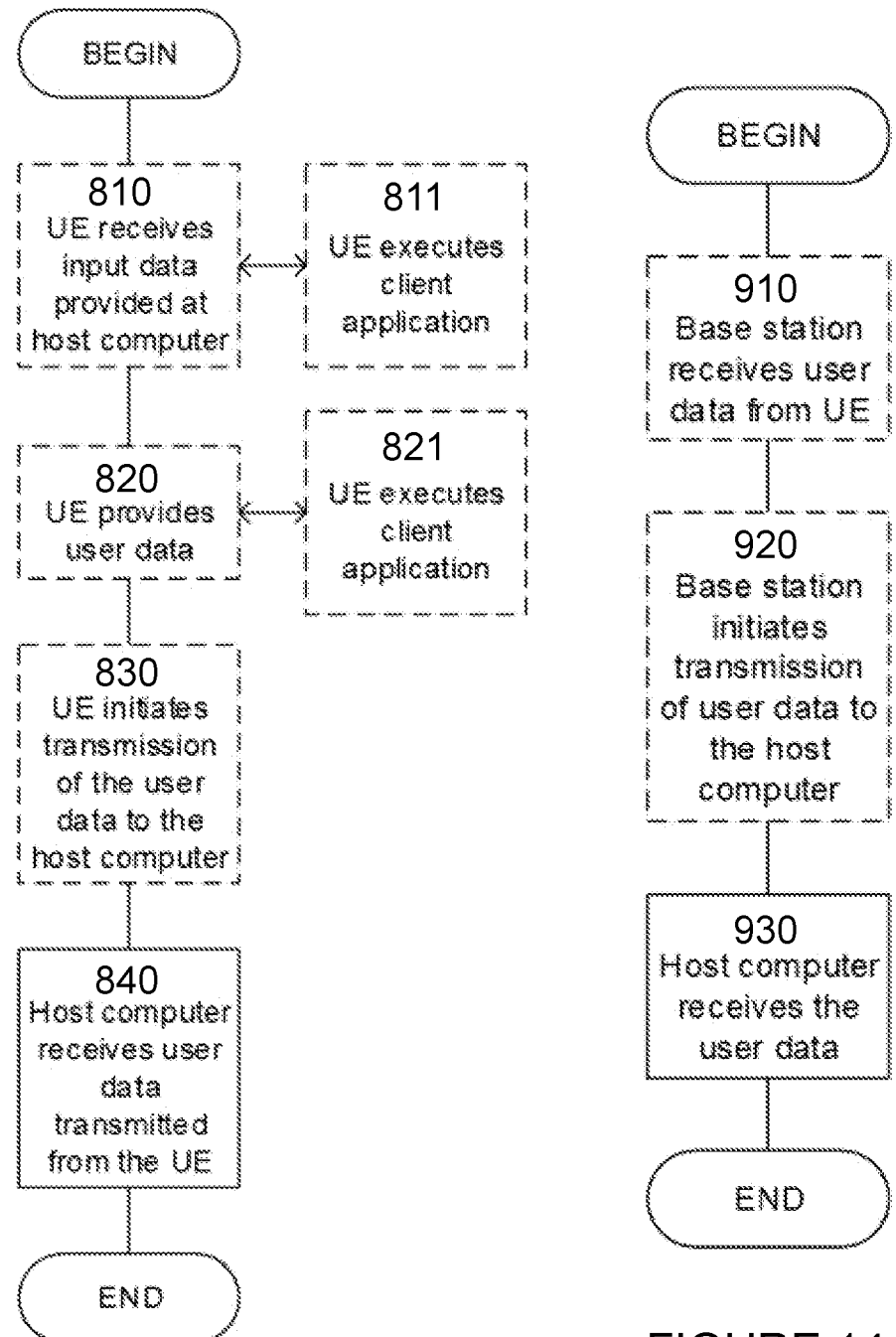
FIG. 13 illustrates another method implemented in a communication system, according to one embodiment.
FIG. 14 illustrates another method implemented in a communication system, according to one embodiment.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 15:
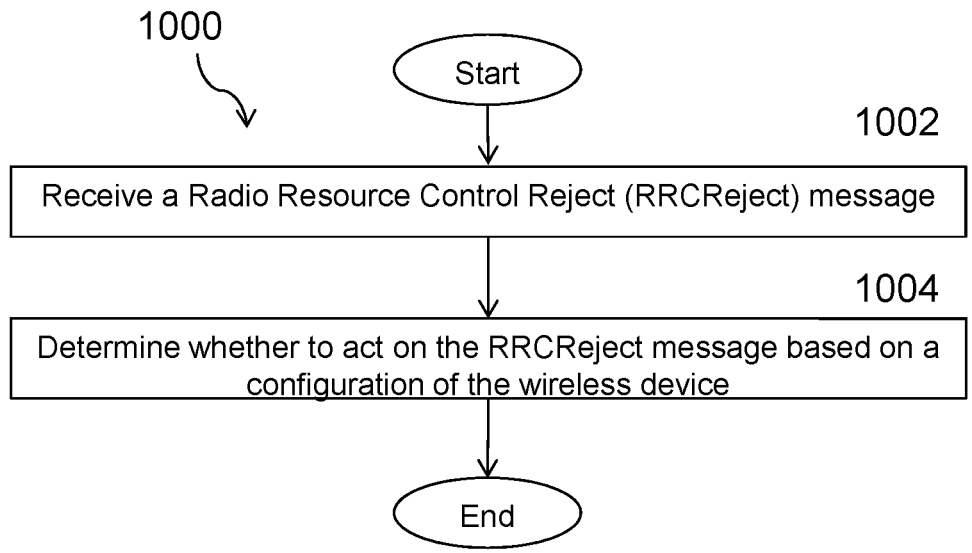
FIG. 15 illustrates an example method by a wireless device, according to certain embodiments.

FIG. 15 depicts a method 1000 performed by a wireless device 110, according to certain embodiments. At step 1002, wireless device 110 receives a RRCReject message. At step 1004, wireless device 110 determines whether to act on the RRCReject message based on a configuration of the wireless device.

In a particular embodiment, wireless device 110 receives a configuration message that includes the configuration from a network node 160.

In a particular embodiment, the configuration activates security in the wireless device 110, and wireless device 110 determines whether to act on the RRCReject message when the wireless device has security activated.

In a particular embodiment, wireless device 110 determines a validity area based on the configuration and determines whether to act on the RRCReject message based on whether the wireless device is within the validity area. In a further particular embodiment, the validity area includes at least one of a cell, a set of cells, a tracking area, and a list of tracking area identifiers.

In a particular embodiment, when determining whether to act on the RRCReject message based on the configuration, the wireless device 110 determines to take at least one action based on the RRCReject message when the wireless device is within the validity area or determines to not act on the RRCReject message when the wireless device is not within the validity area.

In a particular embodiment, when determining whether to act on the RRCReject message based on the configuration, the wireless device 110 determines to not act on the RRCReject message when the wireless device is within the validity area or determines to take at least one action based on the RRCReject message when the wireless device is not within the validity area.

In a particular embodiment, wireless device 110 determines, based on the configuration, that the wireless device is to verify a signature associated with the RRCReject message.

In a particular embodiment, when determining whether to act on the RRCReject message based on the configuration, wireless device 110 determines whether a signature in the RRCReject message is verified. Wireless device 110 takes at least one action based on the RRCReject message when the signature in the RRCReject message is verified or not acts on the RRCReject message when the signature is not verified.

In a particular embodiment, when determining whether to act on the RRCReject message based on the configuration, wireless device 110 determines whether the RRCReject message is transmitted on a signal radio bearer, SRB, that is protected. Wireless device 110 takes at least one action based on the RRCReject message when the RRCReject message is transmitted on the SRB that is protected or not acts on the RRCReject message when the RRCReject message is not transmitted on a SRB that is not protected.

In a particular embodiment, the SRB is protected if the SRB is at least one of integrity protected and encrypted or the SRB is unprotected if the SRB is not integrity protected or encrypted.

In a particular embodiment, the SRB is protected if the SRB is SRB1 or the SRB is unprotected if the SRB is SRB0.

In a particular embodiment, when taking the at least one action, wireless device performs at least one of performing cell reselection, disconnecting from a first network, changing an RRC state at the wireless device, performing a tracking area update, and attempting to connect to a second network.

In a particular embodiment, not acting on the RRCReject message includes at least one of staying connected to a network and not changing an RRC state at the wireless device 110.

In a particular embodiment, when determining whether to act on the RRCReject message based on the configuration, wireless device 110 determines whether the RRCReject message is valid or invalid and reporting the RRCReject message as being valid or invalid to a network.

In a particular embodiment, wireless device 110 considers a cell associated with the RRCReject message as being barred and/or selects another cell that is not associated with the RRCReject message.

In a particular embodiment, determining whether to act on the RRCReject message based on the configuration is based on a type of the RRCReject message.

Figure 16:
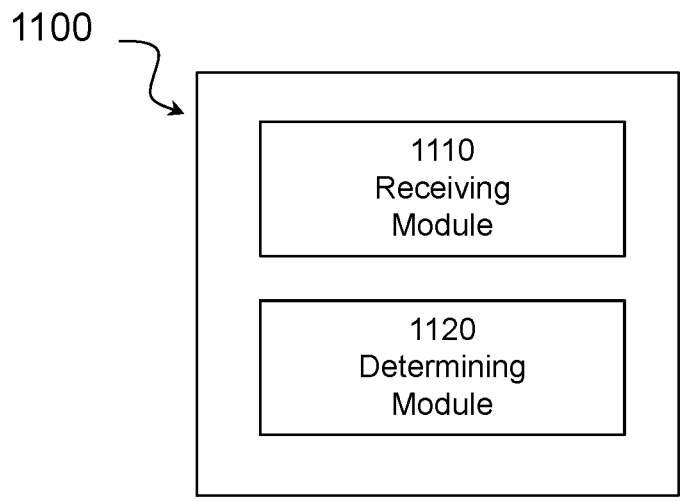
FIG. 16 illustrates an exemplary virtual computing device, according to certain embodiments.

FIG. 16 illustrates a schematic block diagram of a virtual apparatus 1100 in a wireless network (for example, the wireless network shown in FIG. 4). The apparatus may be implemented in a wireless device or network node (e.g., wireless device 110 or network node 160 shown in FIG. 4). Apparatus 1100 is operable to carry out the example method described with reference to FIG. 15 and possibly any other processes or methods disclosed herein. It is also to be understood that the method of FIG. 15 is not necessarily carried out solely by apparatus 1100. At least some operations of the method can be performed by one or more other entities.

Virtual Apparatus 1100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving module 1110, determining module 1120, and any other suitable units of apparatus 100 to perform corresponding functions according one or more embodiments of the present disclosure.

According to certain embodiments, receiving module 1110 may perform certain of the receiving functions of the apparatus 1100. For example, receiving module 1110 may receive a RRCReject message.

According to certain embodiments, determining module 1120 may perform certain of the determining functions of the apparatus 1100. For example, determining module 1120 may determine whether to act on the RRCReject message based on a configuration of the wireless device.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 17:
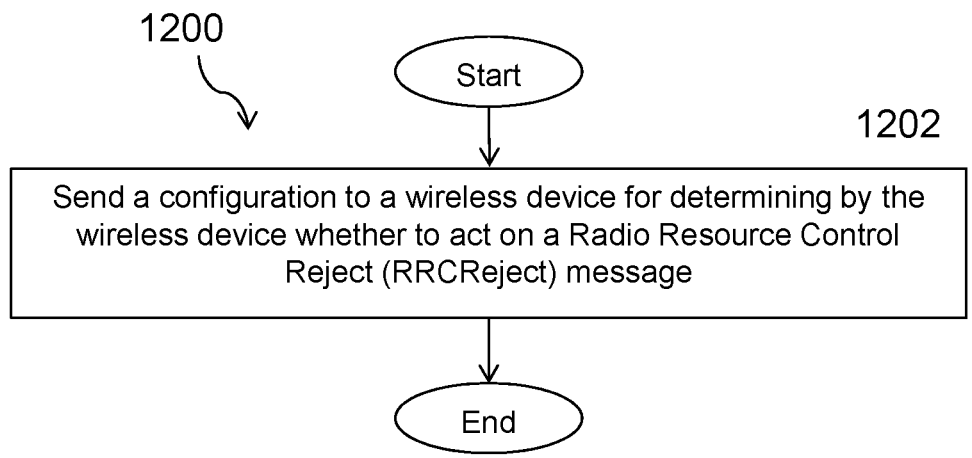
FIG. 17 illustrates an example method by a network node, according to certain embodiments.

FIG. 17 depicts a method 1200 by a network node 160, according to certain embodiments. At step 1602, network node 160 sends a configuration to a wireless device 110 for determining by the wireless device whether to act on a RRCReject message.

In a particular embodiment, the configuration activates security within the wireless device 110, and the method further includes configuring, by network node 160, the wireless device 110 to determine whether to act on a RRCReject message based on the configuration when the wireless device 110 has security activated.

In a particular embodiment, the configuration comprises a validity area, and the network node 160 configures the wireless device 110 to determine whether to act on a RRCReject message based on whether the wireless device 110 is within the validity area. In a particular embodiment, the validity area comprises at least one of: a cell, a set of cells, a tracking area, and a list of tracking area identifiers.

In a particular embodiment, network node 160 configures the wireless device to take at least one action based on the RRCReject message when the wireless device is within the validity area or not act on the RRCReject message when the wireless device is not within the validity area.

In a particular embodiment, network node 160 configures the wireless device to determine to not act on the RRCReject message when the wireless device is within the validity area or determine to take at least one action based on the RRCReject message when the wireless device is not within the validity area.

In a particular embodiment, the configuration indicates that the wireless device 110 is to verify a signature associated with the RRCReject message.

In a particular embodiment, network node 160 configures the wireless device 110 to determine whether a signature in the RRCReject message is verified and take at least one action based on the RRCReject message when the signature in the RRCReject message is verified or not act on the RRCReject message when the signature is not verified.

In a particular embodiment, the configuration configures the wireless device to determine whether the RRCReject message is transmitted on a SRB that is protected and take at least one action based on the RRCReject message when the RRCReject message is transmitted on the SRB that is protected or not act on the RRCReject message when the RRCReject message is not transmitted on a SRB that is not protected.

In a particular embodiment, the SRB is protected if the SRB is at least one of integrity protected and encrypted or the SRB is unprotected if the SRB is not integrity protected or encrypted.

In a particular embodiment, the SRB is protected if the SRB is SRB1 or the SRB is unprotected if the SRB is SRB0.

In a particular embodiment, configuring the wireless device 110 to take the at least one action includes configuring the wireless device 110 to perform at least one of performing cell reselection, disconnecting from a first network, changing an RRC state at the wireless device, performing a tracking area update, and attempting to connect to a second network.

In a particular embodiment, when configuring the wireless device 110 to not act on the RRCReject message, network node 160 configures the wireless device 110 to stay connected to a network and/or not change an RRC state at the wireless device 110.

In a particular embodiment, the configuration configures the wireless device 110 to determine whether the RRCReject message is valid or invalid and report the RRCReject message as being valid or invalid to a network.

In a particular embodiment, the configuration configures the wireless device to perform at least one of consider a cell associated with the RRCReject message as being barred and select another cell that is not associated with the RRCReject message.

In a particular embodiment, the configuration configures the wireless device 110 to determine whether to act on the RRCReject message based on a type of the RRCReject message.

Figure 18:
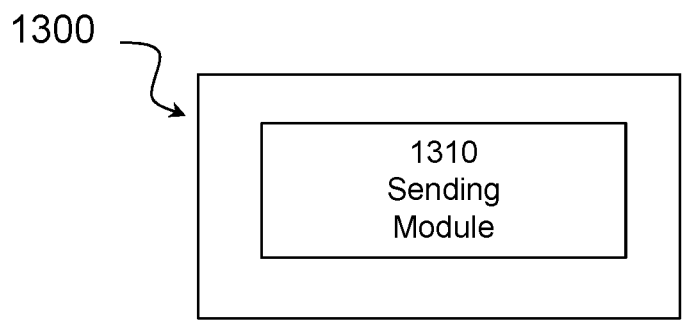
FIG. 18 illustrates another exemplary virtual computing device, according to certain embodiments.

FIG. 18 illustrates a schematic block diagram of a virtual apparatus 1300 in a wireless network (for example, the wireless network shown in FIG. 4). The apparatus may be implemented in a wireless device or network node (e.g., wireless device 110 or network node 160 shown in FIG. 4). Apparatus 1300 is operable to carry out the example method described with reference to FIG. 17 and possibly any other processes or methods disclosed herein. It is also to be understood that the method of FIG. 17 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause sending module 1310 and any other suitable units of apparatus 1300 to perform corresponding functions according one or more embodiments of the present disclosure.

According to certain embodiments, sending module 1310 may perform certain of the sending functions of the apparatus 1300. For example, sending module 1310 may send a configuration to a wireless device 110 for determining by the wireless device whether to act on a RRCReject message.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EXAMPLE EMBODIMENTS

Group A Example Embodiments

Example Embodiment 1. A method performed by a wireless device for identifying and preventing attacks of a false base station during a Reject procedure, the method comprising: determining that an RRCReject message was sent by a false base station and/or tampered with.

Example Embodiment 2. The method of embodiment 1, wherein the determination is based on verifying a signature in the RRCReject message.

Example Embodiment 3. The method of embodiment 1, wherein the determination is based on predetermined network deployments.

Example Embodiment 4. The method of embodiment 1, wherein the determination is based on a configurable RRC stack.

Example Embodiment 5. The method of any of embodiments 1-4, further comprising reporting the false base station to an authentic network.

Example Embodiment 6. The method of any of embodiments 1-5, further comprising considering a cell associated with the false base station to be barred.

Example Embodiment 7. The method of any of the previous embodiments, further comprising: providing user data; and forwarding the user data to a host computer via the transmission to the base station.

Group B Example Embodiments

Example Embodiment 8. A method performed by a base station for identifying and preventing attacks of a false base station during a Reject procedure.

Example Embodiment 9. The method of embodiment 8, further comprising providing an authenticated signature in the RRCReject message.

Example Embodiment 10. The method of embodiment 8, further comprising providing the RRCReject message only on predetermined network deployments.

Example Embodiment 11. The method of embodiment 8, wherein the base station may provide a configurable RRC stack.

Example Embodiment 12. The method of any of embodiments 8-12, further comprising receiving a report of the false base station from a wireless device.

Example Embodiment 13. The method of any of the previous embodiments, further comprising: obtaining user data; and forwarding the user data to a host computer or a wireless device.

Group C Example Embodiments

Example Embodiment 14. A wireless device for identifying and preventing attacks of a false base station during a Reject procedure, the wireless device comprising: processing circuitry configured to perform any of the steps of any of the Group A embodiments; and power supply circuitry configured to supply power to the wireless device.

Example Embodiment 15. A base station for identifying and preventing attacks of a false base station during a Reject procedure, the base station comprising: processing circuitry configured to perform any of the steps of any of the Group B embodiments; power supply circuitry configured to supply power to the base station.

Example Embodiment 16. A user equipment (UE) for identifying and preventing attacks of a false base station during a Reject procedure, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Example Embodiment 17. A communication system including a host computer comprising: processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

Example Embodiment 18. The communication system of the previous embodiment further including the base station.

Example Embodiment 19. The communication system of the previous 2 embodiments, further including the UE, wherein the UE is configured to communicate with the base station.

Example Embodiment 20. The communication system of the previous 3 embodiments, wherein: the processing circuitry of the host computer is configured to execute a host application, thereby providing the user data; and the UE comprises processing circuitry configured to execute a client application associated with the host application.

Example Embodiment 21. A method implemented in a communication system including a host computer, a base station and a user equipment (UE), the method comprising: at the host computer, providing user data; and at the host computer, initiating a transmission carrying the user data to the UE via a cellular network comprising the base station, wherein the base station performs any of the steps of any of the Group B embodiments.

Example Embodiment 22. The method of the previous embodiment, further comprising, at the base station, transmitting the user data.

Example Embodiment 23. The method of the previous 2 embodiments, wherein the user data is provided at the host computer by executing a host application, the method further comprising, at the UE, executing a client application associated with the host application.

Example Embodiment 24. A user equipment (UE) configured to communicate with a base station, the UE comprising a radio interface and processing circuitry configured to performs the of the previous 3 embodiments.

Example Embodiment 25. A communication system including a host computer comprising: processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

Example Embodiment 26. The communication system of the previous embodiment, wherein the cellular network further includes a base station configured to communicate with the UE.

Example Embodiment 27. The communication system of the previous 2 embodiments, wherein: the processing circuitry of the host computer is configured to execute a host application, thereby providing the user data; and the UE's processing circuitry is configured to execute a client application associated with the host application.

Example Embodiment 28. A method implemented in a communication system including a host computer, a base station and a user equipment (UE), the method comprising: at the host computer, providing user data; and at the host computer, initiating a transmission carrying the user data to the UE via a cellular network comprising the base station, wherein the UE performs any of the steps of any of the Group A embodiments.

Example Embodiment 29. The method of the previous embodiment, further comprising at the UE, receiving the user data from the base station.

Example Embodiment 30. A communication system including a host computer comprising: communication interface configured to receive user data originating from a transmission from a user equipment (UE) to a base station, wherein the UE comprises a radio interface and processing circuitry, the UE's processing circuitry configured to perform any of the steps of any of the Group A embodiments.

Example Embodiment 31. The communication system of the previous embodiment, further including the UE.

Example Embodiment 32. The communication system of the previous 2 embodiments, further including the base station, wherein the base station comprises a radio interface configured to communicate with the UE and a communication interface configured to forward to the host computer the user data carried by a transmission from the UE to the base station.

Example Embodiment 33. The communication system of the previous 3 embodiments, wherein: the processing circuitry of the host computer is configured to execute a host application; and the UE's processing circuitry is configured to execute a client application associated with the host application, thereby providing the user data.

Example Embodiment 34. The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Example Embodiment 35. A method implemented in a communication system including a host computer, a base station and a user equipment (UE), the method comprising: at the host computer, receiving user data transmitted to the base station from the UE, wherein the UE performs any of the steps of any of the Group A embodiments.

Example Embodiment 36. The method of the previous embodiment, further comprising, at the UE, providing the user data to the base station.

Example Embodiment 37. The method of the previous 2 embodiments, further comprising: at the UE, executing a client application, thereby providing the user data to be transmitted; and at the host computer, executing a host application associated with the client application.

Example Embodiment 38. The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

Example Embodiment 39. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

Example Embodiment 40. The communication system of the previous embodiment further including the base station.

Example Embodiment 41. The communication system of the previous 2 embodiments, further including the UE, wherein the UE is configured to communicate with the base station.

Example Embodiment 42. The communication system of the previous 3 embodiments, wherein: the processing circuitry of the host computer is configured to execute a host application; the UE is configured to execute a client application associated with the host application, thereby providing the user data to be received by the host computer.

Example Embodiment 43. A method implemented in a communication system including a host computer, a base station and a user equipment (UE), the method comprising: at the host computer, receiving, from the base station, user data originating from a transmission which the base station has received from the UE, wherein the UE performs any of the steps of any of the Group A embodiments.

Example Embodiment 44. The method of the previous embodiment, further comprising at the base station, receiving the user data from the UE.

Example Embodiment 45. The method of the previous 2 embodiments, further comprising at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).

1× RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDCP Packet Data Convergence Protocol
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLC Radio Link Control
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDAP Service Data Adaptation Protocol
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device, the method comprising:
receiving a Radio Resources Control Reject, RRCReject, message; and
determining whether to act on the RRCReject message based on a configuration of the wireless device,
wherein, when determining whether to act on the RRCReject message based on the configuration, the method further comprises determining whether the RRCReject message is valid or invalid and reporting the RRCReject message as being valid or invalid to a network.

2. A wireless device comprising:
processing circuitry configured to:
receive a Radio Resource Control Reject (RRCReject) message; and
determine whether to act on the RRCReject message based on a configuration of the wireless device,
wherein, when determining whether to act on the RRCReject message based on the configuration, the processing circuitry is configured to determine whether the RRCReject message is valid or invalid and report the RRCReject message as being valid or invalid to a network.

3. The wireless device of claim 2, wherein the processing circuitry is configured to receive a configuration message comprising the configuration from a network node.

4. The wireless device of claim 2, wherein:
the configuration activates security in the wireless device, and
determining whether to act on the RRCReject message based on the configuration is performed when the wireless device has security activated.

5. The wireless device of claim 2, wherein the processing circuitry is configured to determine a validity area based on the configuration, and wherein the processing circuitry is configured to determine whether to act on the RRCReject message based on whether the wireless device is within the validity area.

6. The wireless device of claim 5, wherein the validity area comprises at least one of a cell, a set of cells, a tracking area, and a list of tracking area identifiers.

7. The wireless device of claim 5, wherein, when determining whether to act on the RRCReject message based on the configuration, the processing circuitry is configured to:
   determine to take at least one action based on the RRCReject message when the wireless device is within the validity area; or
   determine to not act on the RRCReject message when the wireless device is not within the validity area.

8. The wireless device of claim 5, wherein, when determining whether to act on the RRCReject message based on the configuration, the processing circuitry is configured to:
   determine to not act on the RRCReject message when the wireless device is within the validity area; or
   determine to take at least one action based on the RRCReject message when the wireless device is not within the validity area.

9. The wireless device of claim 2, wherein the processing circuitry is configured to determine, based on the configuration, that the wireless device is to verify a signature associated with the RRCReject message.

10. The wireless device of claim 9, wherein, when determining whether to act on the RRCReject message based on the configuration, the processing circuitry is configured to:
    determine whether a signature in the RRCReject message is verified; and
    take at least one action based on the RRCReject message when the signature in the RRCReject message is verified or not acting on the RRCReject message when the signature is not verified.

11. The wireless device of claim 2, wherein, when determining whether to act on the RRCReject message based on the configuration, the processing circuitry is configured to:
    determine whether the RRCReject message is transmitted on a signal radio bearer, SRB, that is protected; and
    take at least one action based on the RRCReject message when the RRCReject message is transmitted on the SRB that is protected or not acting on the RRCReject message when the RRCReject message is not transmitted on a SRB that is not protected.

12. The wireless device of claim 11, wherein:
    the SRB is protected if the SRB is at least one of integrity protected and encrypted, or
    the SRB is unprotected if the SRB is not integrity protected or encrypted.

13. The wireless device of claim 11, wherein:
    the SRB is protected if the SRB is SRB1, or
    the SRB is unprotected if the SRB is SRB0.

14. The wireless device of claim 7, wherein, when taking the at least one action, the processing circuitry is configured to perform at least one of:
    performing cell reselection;
    disconnecting from a first network;
    changing an RRC state at the wireless device;
    performing a tracking area update; and
    attempting to connect to a second network.

15. The wireless device of claim 7, wherein, when not acting on the RRCReject message, the processing circuitry is configured to perform at least one of staying connected to a network and not changing an RRC state at the wireless device.

16. The wireless device of claim 2, wherein the processing circuitry is configured to perform at least one of:
    considering a cell associated with the RRCReject message as being barred; and
    selecting another cell that is not associated with the RRCReject message.

17. The wireless device of claim 2, wherein determining whether to act on the RRCReject message is based on a type of the RRCReject message.

18. A method performed by a network node, the method comprising:
    sending a configuration to a wireless device for determining by the wireless device whether to act on a Radio Resource Control Reject, RRCReject, message,
    wherein the configuration configures the wireless device to determine whether the RRCReject message is valid or invalid and report the RRCReject message as being valid or invalid to a network.

19. A network node comprising:
    processing circuitry configured to send a configuration to a wireless device for determining whether to act on a Radio Resource Control Reject, RRCReject, message,
    wherein the configuration configures the wireless device to determine whether the RRCReject message is valid or invalid and report the RRCReject message as being valid or invalid to a network.

20. The network node of claim 19, wherein:
    the configuration activates security within the wireless device, and
    the processing circuitry configures the wireless device to determine whether to act on a RRCReject message based on the configuration when the wireless device has security activated.

21. The network node of claim 19, wherein:
    the configuration comprises a validity area, and
    the processing circuitry configures the wireless device to determine whether to act on a RRCReject message based on whether the wireless device is within the validity area.

22. The network node of claim 21, wherein the validity area comprises at least one of: a cell, a set of cells, a tracking area, and a list of tracking area identifiers.

23. The network node of claim 21, wherein the processing circuitry is configured to:
    configure the wireless device to determine to take at least one action based on the RRCReject message when the wireless device is within the validity area; or
    configure the wireless device to determine to not act on the RRCReject message when the wireless device is not within the validity area.

24. The network node of claim 21, wherein the processing circuitry is configured to:
    configure the wireless device to determine to not act on the RRCReject message when the wireless device is within the validity area; or
    configure the wireless device to determine to take at least one action based on the RRCReject message when the wireless device is not within the validity area.

25. The network node of claim 19, wherein the configuration indicates that the wireless device is to verify a signature associated with the RRCReject message.

* * * * *